(12) United States Patent  
Porat et al.

(10) Patent No.: US 8,458,407 B2  
(45) Date of Patent: Jun. 4, 2013

(54) DEVICE AND METHOD FOR GENERATING CACHE USER INITIATED PRE-FETCH REQUESTS

(75) Inventors: Rotem Porat, Kfar Saba (IL); Moshe Anschel, Kafr-Sabe (IL); Shai Koren, Ra'Anana (IL); Itay Peled, Beer-Sheva (IL); Erez Steinberg, Tel Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 909 days.

(21) Appl. No.: 12/530,575

(22) PCT Filed: Mar. 13, 2007

(86) PCT No.: PCT/IB2007/050845  
§ 371 (c)(1),  
(2), (4) Date: Sep. 9, 2009

(87) PCT Pub. No.: WO2008/110874  
PCT Pub. Date: Sep. 18, 2008

(65) Prior Publication Data  
US 2010/0122037 A1    May 13, 2010

(51) Int. Cl.  
*G06F 12/00* (2006.01)

(52) U.S. Cl.  
USPC ............ 711/137; 711/167; 711/E12.057

(58) Field of Classification Search  
None  
See application file for complete search history.

(56) References Cited

U.S. PATENT DOCUMENTS

| | | | | |
|---|---|---|---|---|
| 5,361,391 | A * | 11/1994 | Westberg | 711/137 |
| 6,401,192 | B1 | 6/2002 | Schroter et al. | |
| 6,490,658 | B1 * | 12/2002 | Ahmed et al. | 711/140 |
| 6,901,486 | B2 * | 5/2005 | Handgen et al. | 711/137 |
| 2004/0268051 | A1 | 12/2004 | Berg et al. | |
| 2006/0277308 | A1 * | 12/2006 | Morse et al. | 709/227 |

OTHER PUBLICATIONS

International Search Report and Written Opinion correlating to PCT/IB2007/050845 dated Dec. 5, 2007.

* cited by examiner

*Primary Examiner* — Reginald Bragdon  
*Assistant Examiner* — Eric Loonan

(57) ABSTRACT

A method for generating cache user initiated pre-fetch requests, the method comprises initiating a sequence of user initiated pre-fetch requests; the method being characterized by: determining the timing of user initiated pre-fetch requests of the sequence of user initiated pre-fetch requests in response to: the timing of an occurrence of a last triggering event, a user initiated pre-fetch sequence delay period and a user initiated pre-fetch sequence rate.

11 Claims, 5 Drawing Sheets

DEVICE AND METHOD FOR GENERATING CACHE USER INITIATED PRE-FETCH REQUESTS

FIELD OF THE INVENTION

The present invention relates to a method and a device for generating cache user initiated pre-fetch requests.

BACKGROUND OF THE INVENTION

Cache modules are high-speed memories that facilitate fast retrieval of information including data and instructions. Typically, cache modules are relatively expensive and are characterized by their small size, especially in comparison to higher-level memory modules.

The performance of modern processor-based systems usually depends upon the cache module performances and especially on the relationship between cache hits and cache misses. A cache hit occurs when an information unit, present in a cache module memory, is requested. A cache miss occurs when the requested information unit is not present in the cache module and has to be fetched from an alternative memory, termed as a higher-level memory module.

Various cache modules and processor architectures, as well as data retrieval schemes, were developed over the years to meet increasing performance demands. The cache architecture included multi-port cache modules, multi-level cache module architecture, super scalar type processors and the like.

Processors and other information requesting components are capable of requesting information from a cache module and, alternatively or additionally, from another memory module that can be a higher-level memory module. The higher-level memory module can also be a cache memory, another internal memory and even an external memory.

There are various ways to write information to a cache module or a higher-level memory module. Write-through involves writing one or more information units to the cache module and to the higher-level memory module simultaneously. Write-back involves writing one or more information units to the cache module. The cache module sends one or more updated information units to the high-level memory, once the updated information unit or units are removed from the cache. The latter operation is also known in the art as flushing the cache.

Some prior art cache modules perform mandatory fetch operations, hardware initiated fetch operations (also known as speculative fetch operations or as speculative pre-fetch operations) and user initiated pre-fetch operations (also known as software pre-fetch requests). A mandatory fetch operation involves fetching an information unit that caused a cache miss. The speculative fetch operations are aimed to reduce cache miss events, and replace not-valid segments with valid segments. User initiated pre-fetch request can be initiated by a program being executed by a processor. The user initiated pre-fetch requests aim to send data to the cache module before the execution of the program results in cache misses.

A typical scenario of user initiated pre-fetch utilization is in image processing. If a certain area of an image should be processed and image data that represents that area can not be fetched during a single fetch operation then the program can include pre-fetch instructions that fetch a required image area to the cache module before the program starts processing the image data. A single user initiated pre-fetch instruction can program the cache to start a user initiated pre-fetch request sequence that would bring all the necessary data blocks to the cache.

Pre-fetch operations generate additional load on the machine's resources. This may result in performance degradation and stalling of the mandatory triggering operations.

There is a need to provide an efficient method and a device for performing a pre-fetch operation, with minimal performance impact and maximal bus utilization.

SUMMARY OF THE PRESENT INVENTION

A method and device for generating cache pre-fetch requests, as illustrated in the accompanying claims.

BRIEF DESCRIPTION OF THE DRAWINGS

The present invention will be understood and appreciated more fully through the following detailed description taken in conjunction with the drawings in which.

DETAILED DESCRIPTION OF PREFERRED EMBODIMENTS

The following description relates to data fetch operations and to a data cache module. Those skilled in the art will appreciate that the disclosed systems and methods can be modified to instruction retrieval, instruction cache module, and even to a combination of data and instruction retrieval and to cache modules that store both instructions and data.

Figure 1:
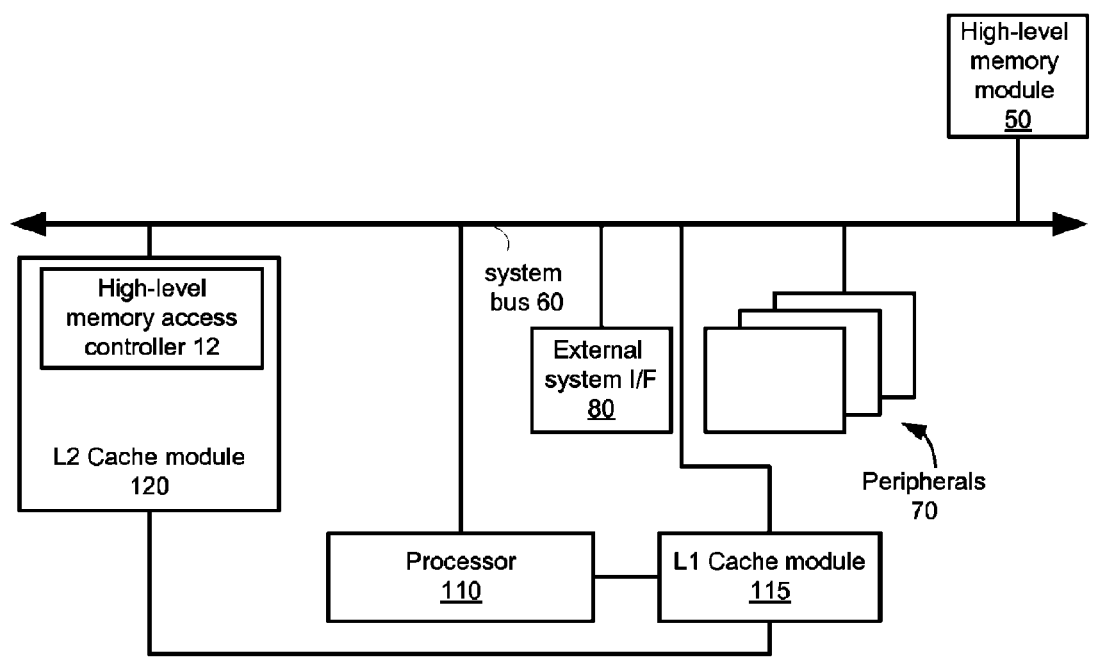
FIG. 1 is a schematic diagram of a device, according to an embodiment of the invention.

FIG. 1 illustrates device 10 according to an embodiment of the invention. Device 10 can be a mobile device can be a stationary device and the like. It can be a mobile phone, a server, a media player, a laptop computer, a desktop computer, a game console and so on. For simplicity, the explanation only shows certain components of device 10, illustrated in FIG. 1.

Referring to FIG. 1, Device 10 includes processor 110, level one (L1) cache module 115, level two (L2) cache module 120 (that includes high-level memory access controller 12), system bus 60, high-level memory module 50, peripherals 70, and external system I/F 80.

System bus 60 is connected to processor 110, L1 cache module 115, L2 cache module 120, high-level memory module 50, peripherals 70 and external system I/F 80. Processor 110 can be also connected (not via system bus 60) to cache module 120.

High-level memory module 50 is an example of a high-level memory module that is accessible by processor 110 and by high-level memory access controller 12. It usually stores programs and data for the various processors. It can also be a high level cache memory module supporting off-chip memory, but this is not necessarily so. If a cache miss occurs, the data can be fetched from the high-level memory module 50 or from other memory modules.

L1 cache module 115 is connected to processor 110 and to L2 cache module 120. If a L1 cache miss occurs then a functional access request is sent to L2 cache module. These functional access requests are denoted 430 in FIG. 2.

Figure 2:
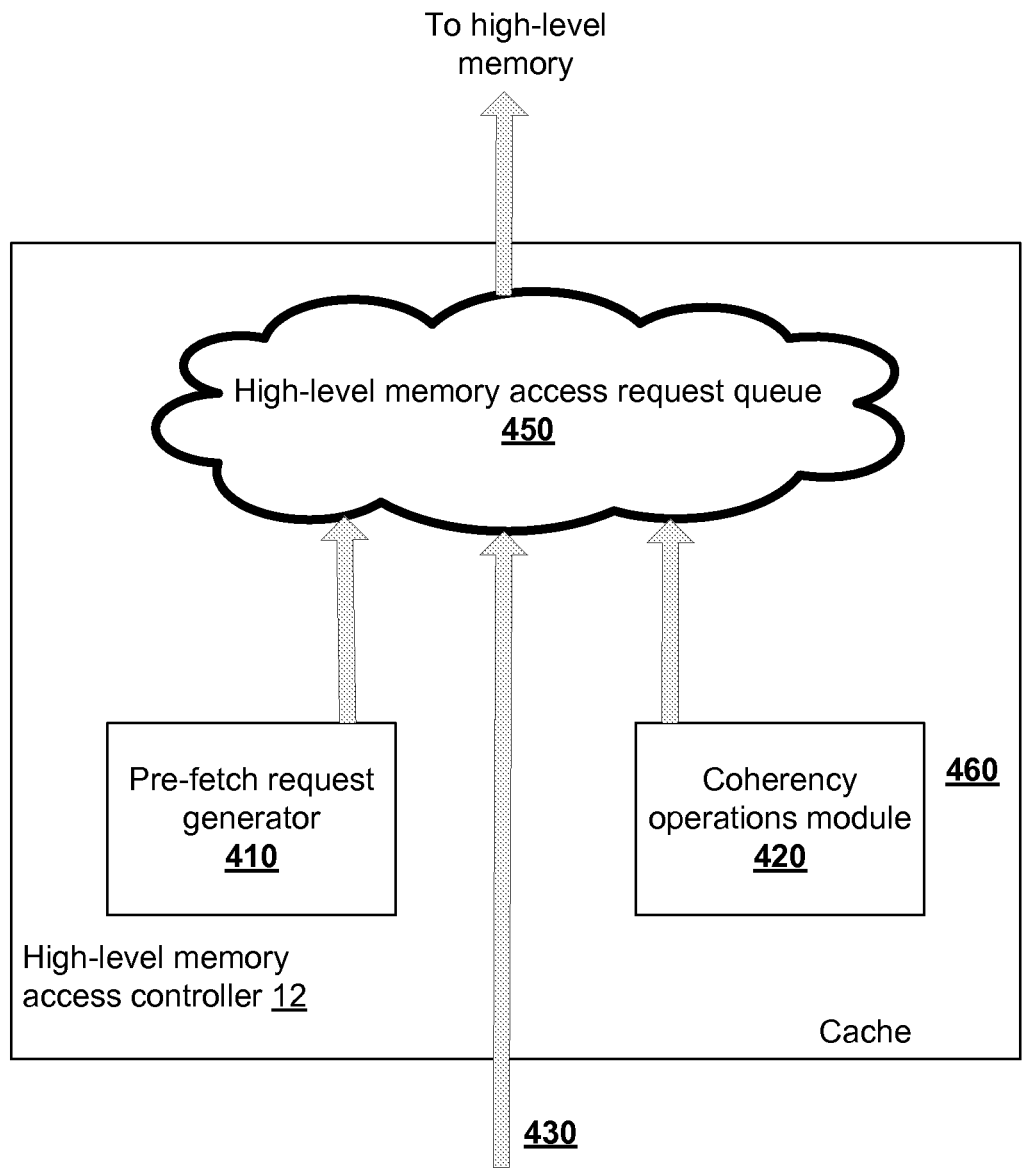
FIG. 2 is a schematic illustration of high-level memory access controller, according to an embodiment of the invention.

FIG. 2 is a schematic illustration of high-level memory access controller 12, according to an embodiment of the invention.

High-level memory access controller 12 is included within device 10. It can be a part of L2 cache module 120 but this is not necessarily so. High-level memory access controller 12 controls accesses to a memory unit that is above a certain cache memory. It is noted that the high-level memory unit itself can be a cache module.

High-level memory access controller 12 includes user initiated pre-fetch request generator 410 and coherency operations module 420. User initiated pre-fetch request generator 410 is connected to high-level memory access request queue 450. Coherency operations module 420 is connected to high-level memory access request queue 450. It is noted that high-level memory access controller 12 can also include a speculative fetch module that is not shown for simplicity of explanation. High-level memory access controller 12 can receive functional access requests (denoted 430) from processor 110 (via L1 cache 115).

High-level memory access request queue 450 receives triggering event requests and/or triggering event request indications from the coherency operations module 420 and also receives triggering events and/or triggering event indications (such as fetch request from processor 110).

Additionally, high-level memory access request queue 450 receives user initiated pre-fetch requests from user initiated pre-fetch request generator 410.

In this embodiment of the invention, the user initiated pre-fetch request generator 410 receives user initiated pre-fetch sequence delay period value and user initiated pre-fetch sequence rate value from an external user. Additionally, the user initiated pre-fetch request generator 410 receives the timing of the last triggering event, and determines the generation of a sequence of user initiated pre-fetch events. The cache access request queue 450 manages the requests based on their priority and accesses a higher memory level, to retrieve the required data unit.

Conveniently, FIG. 3-6 refer to a cache module that can be L2 cache module 120 of FIG. 1.

Figure 3:
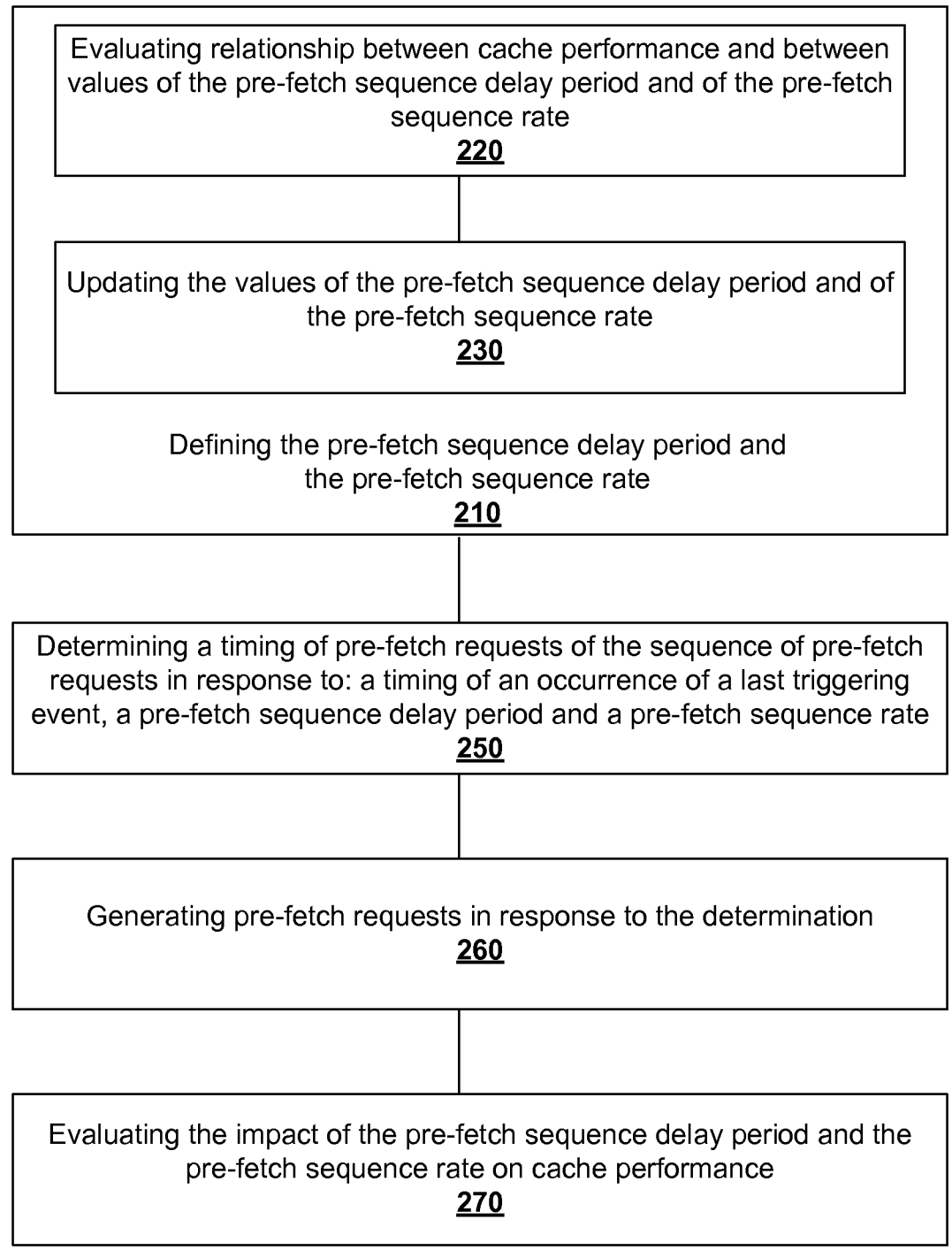
FIG. 3 is a flow diagram of a method for generating cache pre-fetch requests, according to an embodiment of the invention.

FIG. 3 is a flow diagram of method 200 for generating cache user initiated pre-fetch requests, according to an embodiment of the invention.

Method 200 starts at stage 210 of defining a user initiated pre-fetch sequence delay period and the user initiated pre-fetch sequence rate. A user initiated pre-fetch sequence delay period is the time difference between the occurrence of a last triggering event and the generation of a sequence of user initiated pre-fetch requests. The user initiated pre-fetch sequence rate represents the time gap between consecutive user initiated pre-fetch requests, in a sequence of user initiated pre-fetch requests.

Stage 210 conveniently includes stage 220 of evaluating the relationship between cache performance, values of the user initiated pre-fetch sequence rate and the user initiated pre-fetch sequence delay.

Conveniently, the values of the user initiated pre-fetch sequence rate and the user initiated pre-fetch sequence delay are determined such, as to provide the most efficient cache performance in terms of minimal performance impact and maximal bus utilization.

Stage 210 is followed by stage 250 of determining the timing of user initiated pre-fetch requests of the sequence of user initiated pre-fetch requests in response to: the timing of an occurrence of a last triggering event, a user initiated pre-fetch sequence delay period and a user initiated pre-fetch sequence rate.

The determination can include: (i) comparing the time elapsed from the last triggering event with the value of the user initiated pre-fetch sequence delay period, (ii) comparing (if the user initiated pre-fetch request is not the first user initiated pre-fetch request in a user initiated pre-fetch sequence) the time elapsed from the last user initiated pre-fetch event with the value of user initiated pre-fetch sequence rate.

A triggering event can include generation of a (non-speculative) fetch request, completion of a fetch operation, generation of a fetch request to a predefined address range, completion of a fetch operation to the predefined address range, generation of a fetch request with a specific attribute (e.g. priority), completion of a fetch operation associated with the specific attribute, an occurrence of a fetch miss, generation of a sequence of a predefined number of fetch requests, completion of a sequence of a predefined number of fetch operations, generation of a coherency operation, completion of a coherency operation, a request to read an internal status or state of the cache module, completion of a read operation of a certain status field, and the like.

According to an embodiment of the invention method 200 also includes stage 270 of evaluating the impact of the user initiated pre-fetch sequence delay period and the user initiated pre-fetch sequence rate on cache performance. Stage 270 can be followed by stage 210 during which the values of the user initiated pre-fetch sequence delay period and the user initiated pre-fetch sequence rate can be re-defined.

Figure 4:
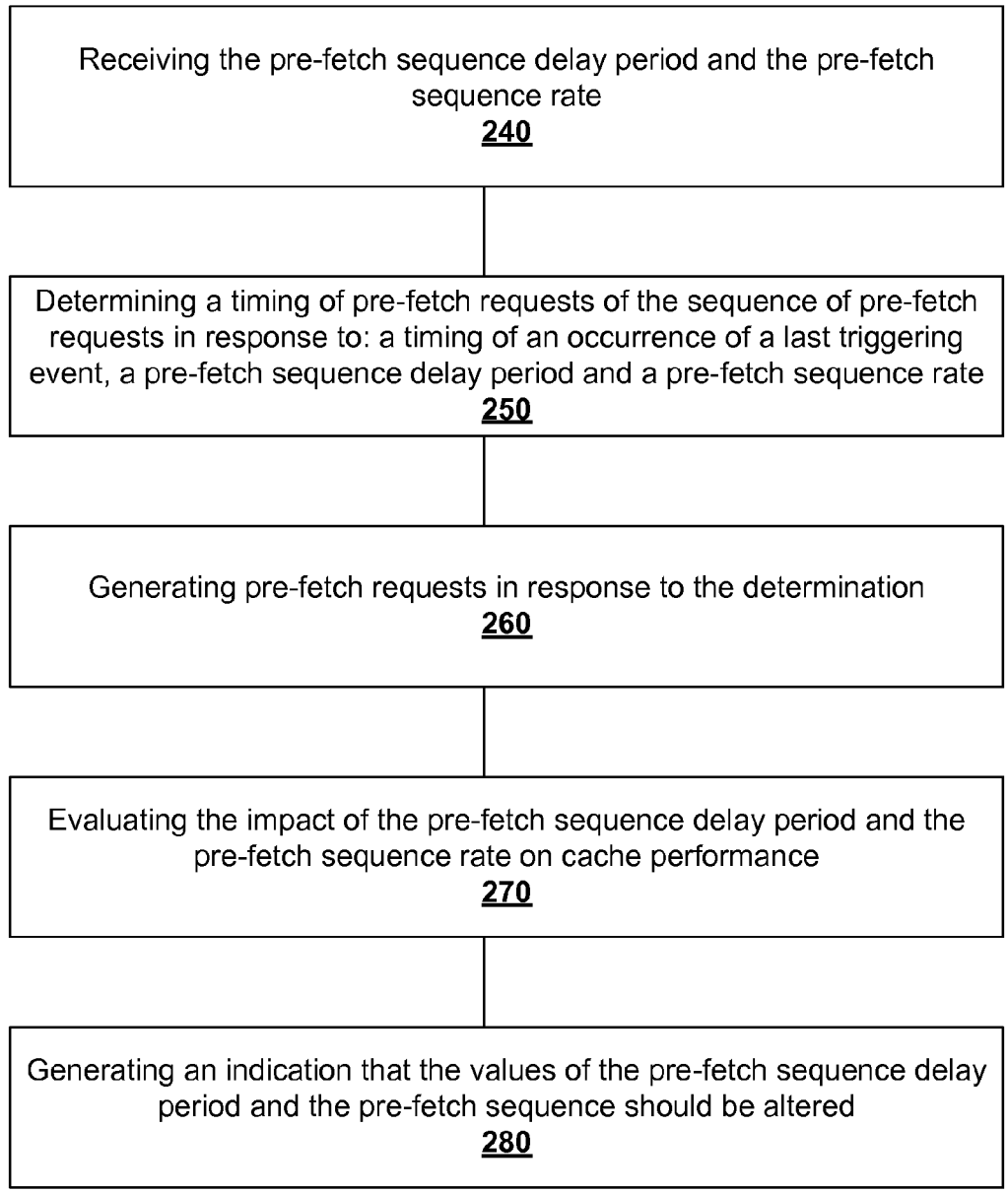
FIG. 4 is a flow diagram of a method for generating cache pre-fetch requests, according to another embodiment of the invention.

FIG. 4 illustrates method 202 according to another embodiment of the invention.

Method 202 starts by stage 240 of receiving the values of the user initiated pre-fetch sequence delay period and the user initiated pre-fetch sequence rate.

Stage 240 is followed by stage 250 of determining the timing of user initiated pre-fetch requests of the sequence of user initiated pre-fetch requests in response to: the timing of an occurrence of a last triggering event, a user initiated pre-fetch sequence delay period and a user initiated pre-fetch sequence rate.

Conveniently, stage 260 can be followed by stage 270 of evaluating the impact of the user initiated pre-fetch sequence delay period and the user initiated pre-fetch sequence rate on cache performance. Stage 270 can be followed by stage 280, generating an indication that the values of the user initiated pre-fetch sequence delay period and the user initiated pre-fetch sequence should be altered. This indication is sent if a certain control criterion (such as sub-optimal cache performance) is fulfilled.

According to yet another embodiment of the invention, a combination of stages 210 and 240 can be provided. In this case, alteration of the values of the user initiated pre-fetch sequence delay period and the user initiated pre-fetch sequence rate within a certain range can be performed automatically (for example by applying stage 210) while other alterations should require user intervention.

Figure 5:
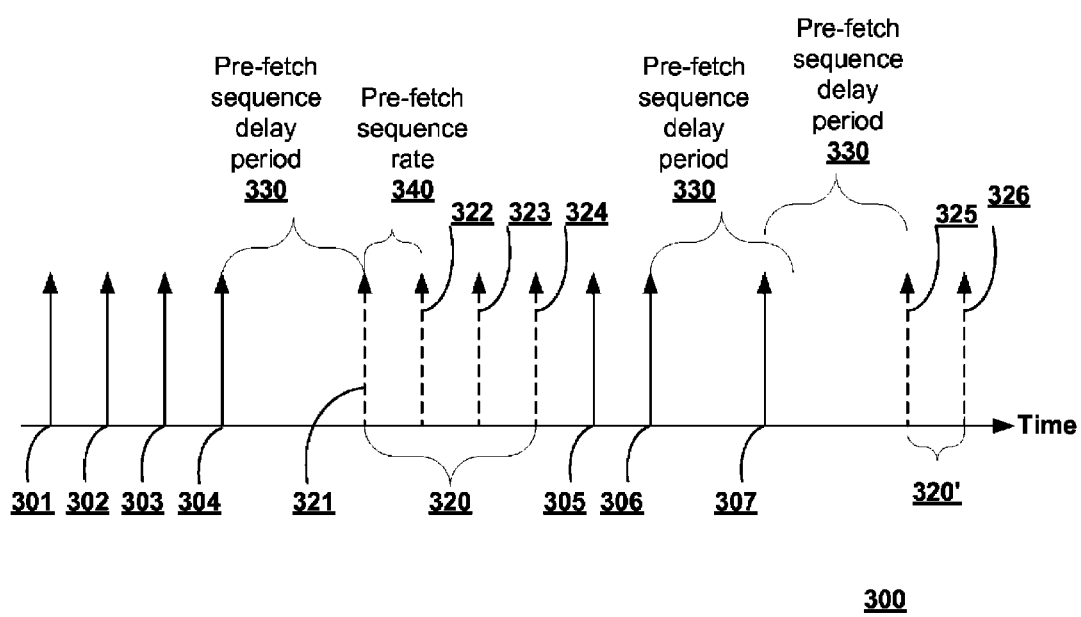
FIG. 5 is a timing diagram illustrating a triggering of events and a pre-fetch sequence, according to an embodiment of the invention.

FIG. 5 is timing diagram 300 illustrating first user initiated pre-fetch sequence 320, second user initiated pre-fetch sequence 320', and triggering events 301-307, according to an embodiment of the invention.

Timing diagram 300 starts by a first sequence of triggering events 301-304. The timing difference between successive triggering events is smaller than the user initiated pre-fetch sequence delay period 330, thus no user initiated pre-fetch request is generated until after the first sequence of triggering events ends.

After a user initiated pre-fetch sequence delay period 330 has passed after the last triggering event occurrence (304) of the first sequence of triggering events, the first user initiated pre-fetch request 321 of first user initiated pre-fetch sequence 320 occurs.

First user initiated pre-fetch sequence 320 includes user initiated pre-fetch requests 321-324. The time difference between pre-fetch requests of first pre-fetch sequence 320 is equal to pre-fetch sequence rate 340.

First user initiated pre-fetch sequence 320 ends due to the occurrence of a second sequence of triggering events that includes triggering events 305-307. The time difference between successive triggering events is smaller than the user initiated pre-fetch sequence delay period 330, thus no user initiated pre-fetch request is generated until after the occurrence of triggering event 307.

After a user initiated pre-fetch sequence delay period 330 has passed from the occurrence of the last triggering event 307 of the second sequence of triggering events, the first user initiated pre-fetch request 325 of second user initiated pre-fetch sequence 320' occurs.

Second user initiated pre-fetch sequence 320' includes user initiated pre-fetch requests 325 and 326. The time difference between user initiated pre-fetch requests of second user initiated pre-fetch sequence 320' is equal to user initiated pre-fetch sequence rate 340.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for generating user initiated cache pre-fetch requests, the method comprises:
    initiating a sequence of user initiated pre-fetch requests;
    determining a timing of user initiated pre-fetch requests of the sequence of user initiated pre-fetch requests in response to: a timing of an occurrence of a last triggering event, a user initiated pre-fetch sequence delay period and a user initiated pre-fetch sequence rate.

2. The method according to claim 1, further comprising defining the user initiated pre-fetch sequence delay period and the user initiated pre-fetch sequence rate.

3. The method according to claim 2, wherein the stage of defining comprises:
    evaluating a relationship between cache performance, values of the user initiated pre-fetch sequence delay period and of the user initiated pre-fetch sequence rate; and
    updating the values of the user initiated pre-fetch sequence delay period and of the user initiated pre-fetch sequence rate, in response to the relationship evaluated.

4. The method according to claim 1, further comprising receiving the user initiated pre-fetch sequence delay period and the user initiated pre-fetch sequence rate.

5. The method according to claim 1, further comprising evaluating an impact of the user initiated pre-fetch sequence delay period and the user initiated pre-fetch sequence rate on cache performance.

6. The method according to claim 1, further comprising generating an indication that values of the user initiated pre-fetch sequence delay period and the user initiated pre-fetch sequence rate should be altered in response to an evaluation of an impact of the user initiated pre-fetch sequence delay period and the user initiated pre-fetch sequence rate on cache performance.

7. A device which has user initiated pre-fetch capabilities, comprising:
    a cache module; and
    a high-level memory access controller adapted to: (i) determine a timing of user initiated pre-fetch requests of a sequence of user initiated pre-fetch requests in response to a timing of an occurrence of a last triggering event, a user initiated pre-fetch sequence delay period and a user initiated pre-fetch sequence rate, and (ii) initiate the sequence of user initiated pre-fetch requests in response to the determination.

8. The device according to claim 7, further adapted to define the user initiated pre-fetch sequence delay period and the user initiated pre-fetch sequence rate.

9. The device according to claim 7, further adapted to receive the user initiated pre-fetch sequence delay period and the user initiated pre-fetch sequence rate.

10. The device according to claim 7, adapted to evaluate an impact of the user initiated pre-fetch sequence delay period and the user initiated pre-fetch sequence rate on cache performance.

11. The device according to claim 7, further adapted to generate an indication that values of the user initiated pre-fetch sequence delay period and the user initiated pre-fetch sequence rate should be altered in response to the evaluation of an impact of the user initiated pre-fetch sequence delay period and the user initiated pre-fetch sequence rate on cache performance.

* * * * *